United States Patent
Jacob et al.

(10) Patent No.: US 10,207,463 B2
(45) Date of Patent: Feb. 19, 2019

(54) METHOD FOR PRODUCING A FIBER COMPOSITE COMPONENT FOR AEROSPACE

(75) Inventors: Torben Jacob, Beckdorf (DE); Joachim Piepenbrock, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/227,679

(22) PCT Filed: Jul. 5, 2007

(86) PCT No.: PCT/EP2007/056856
§ 371 (c)(1),
(2), (4) Date: Mar. 6, 2009

(87) PCT Pub. No.: WO2008/003768
PCT Pub. Date: Jan. 10, 2008

(65) Prior Publication Data
US 2009/0166935 A1    Jul. 2, 2009

Related U.S. Application Data

(60) Provisional application No. 60/818,775, filed on Jul. 6, 2006.

(30) Foreign Application Priority Data

Jul. 6, 2006   (DE) .......... 10 2006 031 325

(51) Int. Cl.
*B29C 70/44*    (2006.01)
*B29C 70/30*    (2006.01)
(Continued)

(52) U.S. Cl.
CPC .......... *B29C 70/30* (2013.01); *B29C 33/3821* (2013.01); *B29C 33/505* (2013.01);
(Continued)

(58) Field of Classification Search
CPC ... B29C 70/30; B29C 70/446; B29C 33/3821; B29C 33/76; B29C 33/54; B29C 33/505; B29C 70/443; B29D 99/0014
(Continued)

(56) References Cited

U.S. PATENT DOCUMENTS 2,244,107 A   6/1941 Hayes
3,143,306 A   8/1964 Dijkmans et al.
(Continued)

FOREIGN PATENT DOCUMENTS

DE   1604528   11/1970
DE   1671756   10/1971
(Continued)

OTHER PUBLICATIONS

International Search Report and Written Opinion for PCT/EP/2007/056799 dated Sep. 26, 2007.
(Continued)

*Primary Examiner* — Yogendra N Gupta
*Assistant Examiner* — Ninh Le
(74) *Attorney, Agent, or Firm* — Jenkins, Wilson, Taylor & Hunt, P.A.

(57) ABSTRACT

The invention relates to a method and a molding core for producing a fiber composite component (34), in particular in aerospace, comprising the following method steps: introducing a core sleeve (9) into a molding tool (2) for establishing an outer geometry of a molding core (27) to be formed; filling the core sleeve (9) that is introduced with a vacuum-fixable filling material (21); applying a vacuum to the core sleeve (9) and consequently vacuum-fixing the filling material (21) for forming the molding core (27); and at least partly laying at least one semifinished fiber product
(Continued)

(33a, 33b) on the molding core (27) that is formed, for the shaping of the fiber composite component (34) to be produced.

17 Claims, 5 Drawing Sheets

(51) Int. Cl.
| | |
|---|---|
| B29C 33/38 | (2006.01) |
| B29C 33/50 | (2006.01) |
| B29C 33/54 | (2006.01) |
| B29C 33/76 | (2006.01) |
| B29D 99/00 | (2010.01) |
| B29L 31/30 | (2006.01) |

(52) U.S. Cl.
CPC .............. *B29C 33/54* (2013.01); *B29C 33/76* (2013.01); *B29C 70/443* (2013.01); *B29C 70/446* (2013.01); *B29D 99/0014* (2013.01); *B29L 2031/3082* (2013.01); *Y02T 50/43* (2013.01)

(58) Field of Classification Search
USPC .................................. 264/257, 219, 511, 571
See application file for complete search history.

(56) References Cited

U.S. PATENT DOCUMENTS

| | | | |
|---|---|---|---|
| 3,279,739 A | 10/1966 | Long | |
| 3,279,741 A | 10/1966 | Long | |
| 3,551,237 A | 12/1970 | Cox et al. | |
| 3,629,030 A | 12/1971 | Ash | |
| 3,754,717 A | 8/1973 | Saidla | |
| 3,795,559 A | 3/1974 | Horn et al. | |
| 3,995,081 A | 11/1976 | Fant et al. | |
| 4,094,688 A | 6/1978 | Wolf | |
| 4,155,970 A | 5/1979 | Cassell | |
| 4,248,817 A | 2/1981 | Frank | |
| 4,271,116 A | 6/1981 | Jones | |
| 4,503,105 A | 3/1985 | Tomioka | |
| 4,520,988 A | 6/1985 | Walker | |
| 4,624,874 A | 11/1986 | Schutze | |
| 4,758,397 A | 7/1988 | Schreiner et al. | |
| 4,853,172 A | 8/1989 | Jacaruso et al. | |
| 4,871,599 A | 10/1989 | Knorr | |
| 4,902,458 A | 2/1990 | Trimble | |
| 4,943,334 A | 7/1990 | Medney | |
| 5,041,315 A | 8/1991 | Searle et al. | |
| 5,045,251 A | 9/1991 | Johnson | |
| 5,176,864 A | 1/1993 | Bates et al. | |
| 5,260,121 A * | 11/1993 | Gardner ............ C08G 59/4014 | |
| | | | 428/299.1 |
| 5,262,121 A * | 11/1993 | Goodno ........................ 264/571 |
| 5,376,326 A | 12/1994 | Medney | |
| 5,387,098 A | 2/1995 | Willden | |
| 5,505,492 A | 4/1996 | Nelson | |
| 5,527,414 A | 6/1996 | Dublinski et al. | |
| 5,897,739 A * | 4/1999 | Forster ................. B29C 70/342 |
| | | | 156/285 |
| 5,931,830 A | 8/1999 | Jacobsen et al. | |
| 5,989,481 A | 11/1999 | You | |
| 6,013,125 A | 1/2000 | Quraishi et al. | |
| 6,146,576 A | 11/2000 | Blackmore | |
| 6,458,306 B1 | 10/2002 | Nelson et al. | |
| 6,458,309 B1 | 10/2002 | Allen | |
| 6,562,436 B2 | 5/2003 | George et al. | |
| 6,632,502 B1 | 10/2003 | Allen et al. | |
| 6,638,466 B1 | 10/2003 | Abbott | |
| 6,692,681 B1 * | 2/2004 | Lunde .................... B29C 43/12 |
| | | | 156/173 |
| 6,889,937 B2 | 5/2005 | Simpson et al. | |
| 7,192,543 B2 | 3/2007 | Malfliet | |
| 7,294,220 B2 | 11/2007 | Anderson | |
| 7,531,058 B2 | 5/2009 | George et al. | |
| 8,500,085 B2 | 8/2013 | Jacob et al. | |
| 8,906,489 B2 | 12/2014 | Jacob et al. | |
| 9,492,974 B2 | 11/2016 | Zahlen et al. | |
| 2002/0022422 A1 | 2/2002 | Waldrop et al. | |
| 2002/0038923 A1 | 4/2002 | Lenherr | |
| 2002/0056788 A1 * | 5/2002 | Anderson et al. ............ 244/119 |
| 2003/0183983 A1 | 10/2003 | Schmidt | |
| 2004/0103918 A1 * | 6/2004 | Teufel et al. ..................... 134/8 |
| 2004/0216805 A1 * | 11/2004 | Teufel .............................. 141/11 |
| 2005/0002269 A1 * | 1/2005 | Longo ........................... 366/108 |
| 2005/0070644 A1 * | 3/2005 | Tikuisis et al. ................ 524/115 |
| 2005/0126338 A1 * | 6/2005 | Yadav .............................. 75/255 |
| 2005/0211843 A1 | 9/2005 | Simpson et al. | |
| 2005/0230552 A1 | 10/2005 | Engwall et al. | |
| 2006/0188696 A1 * | 8/2006 | Grose et al. ................... 428/156 |
| 2007/0096368 A1 | 5/2007 | Hanson et al. | |
| 2007/0108665 A1 | 5/2007 | Glain et al. | |
| 2009/0166921 A1 | 7/2009 | Jacob et al. | |
| 2010/0007044 A1 | 1/2010 | Jacob et al. | |
| 2010/0044912 A1 | 2/2010 | Zahlen et al. | |
| 2010/0092708 A1 | 4/2010 | Jacob et al. | |
| 2010/0307694 A1 | 12/2010 | Dieckmann | |
| 2011/0076461 A1 | 3/2011 | Jacob et al. | |

FOREIGN PATENT DOCUMENTS

| | | |
|---|---|---|
| DE | 8711336 | 10/1987 |
| DE | 277234 | 3/1990 |
| DE | 3911312 | 4/1990 |
| DE | 4224526 | 1/1994 |
| DE | 69811606 | 2/2004 |
| DE | 10342867 | 4/2005 |
| EP | 0002711 | 7/1979 |
| EP | 0008012 | 2/1980 |
| EP | 0212140 | 3/1987 |
| EP | 0291203 | 4/1988 |
| EP | 0491650 | 6/1992 |
| EP | 0735639 | 10/1996 |
| EP | 1197309 | 4/2002 |
| EP | 1762355 | 3/2007 |
| FR | 2745745 | 9/1997 |
| GB | 1522432 | 8/1978 |
| GB | 2292332 | 4/1994 |
| GB | 2284173 | 5/1995 |
| JP | 50-044264 | 4/1975 |
| JP | 58-018240 | 2/1983 |
| JP | 59-157807 | 10/1984 |
| JP | 60-000909 | 1/1985 |
| JP | 61-188425 | 8/1986 |
| JP | 63-310310 | 12/1988 |
| JP | 64-082910 | 3/1989 |
| JP | 2248239 | 10/1990 |
| JP | 04-265714 | 9/1992 |
| JP | 06-106632 | 4/1994 |
| JP | 08-142060 | 6/1996 |
| JP | 08203751 | 8/1996 |
| JP | 08207134 | 8/1996 |
| JP | 11090979 | 4/1999 |
| JP | 2003-071864 | 3/2003 |
| JP | 2003-103643 | 4/2003 |
| JP | 03-277532 | 10/2003 |
| JP | 2005-074950 | 3/2005 |
| JP | 2006-512240 | 4/2006 |
| JP | 2008-203751 | 9/2008 |
| JP | 2009-517271 | 4/2009 |
| JP | 2006-512240 | 4/2013 |
| RU | 1123235 A2 | 2/1993 |
| RU | 2080750 | 5/1997 |
| RU | 2143341 C1 | 12/1999 |
| RU | 2217312 | 11/2003 |
| RU | 2242369 C1 | 12/2004 |
| RU | 2271276 C2 | 3/2006 |
| RU | 2285613 C1 | 10/2006 |
| SU | 204550 | 10/1967 |
| SU | 433038 | 6/1974 |
| WO | WO2008701650 | 3/1987 |
| WO | WO 88/01938 | 3/1988 |

(56) References Cited

FOREIGN PATENT DOCUMENTS

| WO | WO9514563 | | 6/1995 | | |
|---|---|---|---|---|---|
| WO | WO9851481 | | 11/1998 | | |
| WO | WO00/01520 | * | 1/2000 | ............ | B29C 33/76 |
| WO | WO2004000643 | | 12/2003 | | |
| WO | WO2005105402 | | 11/2005 | | |
| WO | WO2007062693 | | 6/2007 | | |
| WO | WO2007107553 | | 9/2007 | | |
| WO | WO2008003715 | | 1/2008 | | |
| WO | WO2008003721 | | 1/2008 | | |
| WO | WO2008003733 | | 1/2008 | | |
| WO | WO2008003740 | | 1/2008 | | |
| WO | WO2008003767 | | 1/2008 | | |
| WO | WO2008003768 | | 1/2008 | | |

OTHER PUBLICATIONS

German Office Action for De 10 2006 031 323.2 dated Mar. 16, 2007.
International Search Report and Written Opinion for PCT/EP/2007/056856 dated Oct. 29, 2007.
International Search Report and Written Opinion for PCT/EP/2007/056788 dated Oct. 29, 2007.
German Office Action for DE 10 2006 031 334.8 dated Mar. 15, 2007.
International Search Report and Written Opinion for PCT/EP/2007/056767 dated Nov. 8, 2007.
German Office Action for DE 10 2006 031 326.7 dated Mar. 14, 2007.
International Search Report and Written Opinion for PCT/EP/2007/056855 dated Sep. 25, 2007.
German Office Action for DE 10 2006 031 335.6 dated Mar. 15, 2007.
International Search Report and Written Opinion for PCT/EP/2007/056743 dated Nov. 14, 2007.
German Office Action for DE 10 2006 031 336.4 dated Mar. 21, 2007.
Non-Final Office Action for U.S. Appl. No. 12/309,083 dated Aug. 16, 2011.
Non-Final Office Action for U.S. Appl. No. 12/227,659 dated Nov. 1, 2011.
Airtech, Masterflex "S" Series (Mar. 24, 1997).
Non-Final Office Action for U.S. Appl. No. 12/309,083 dated Nov. 15, 2010.
Final Office Action for U.S. Appl. No. 12/309,083 dated Apr. 4, 2011.
V.P. Pustovoitov "Fibreglasses in building construction", Moscow, Stroyzdat, pp. 64-65 (1978).
Advisory Action for U.S. Appl. No. 12/309,083 dated Jun. 9, 2011.
"Hand Book of Adhesives" pp. 80-81 (1980).
Decision on Grant for Russian Patent Application No. 2009102870/05(003680) dated Jun. 8, 2011.
Decision on Grant for Russian Patent Application No. 2009102868/05(003677) dated Jun. 16, 2011.
Decision to Grant for Russian Appication No. 2009/102869/05(003679) dated Jun. 24, 2011.
Decision to Grant for Russian Application No. 2009/103204/05(004166) dated Jun. 24, 2011.
Non-Final Office Action for U.S. Appl. No. 12/227,659 dated Aug. 3, 2011.
Grant Decision (English) for Russian Application No. 2009103203/05(004165) dated Sep. 5, 2011.
Chinese Grant Notification for CN Appl. No. 2007 8002 5659.0 dated Feb. 1, 2012.
Office Action/Restriction Requirement for U.S. Appl. No. 12/308,793 dated Mar. 19, 2012.
Office Action/Restriction Requirement for U.S. Appl. No. 12/309,015 dated Apr. 13, 2012.
Non-Final Office Action for U.S. Appl. No. 12/309,083 dated Apr. 23, 2012.
Notice of Allowance for U.S. Appl. No. 12/227,659 dated Apr. 24, 2012.
Final Office Action for U.S. Appl. No. 12/309,083 dated Dec. 7, 2011.
Decision to Grant (English) for Russian Application No. 2009/103205/05(004168) dated Oct. 19, 2011.
Japanese Office Action for Application Serial No. JP 2009-517271 (with Engl. Transl.) dated Jul. 11, 2012.
Final Office Action for U.S. Appl. No. 12/308,793 dated Nov. 6, 2012.
Non-Final Office Action for U.S. Appl. No. 12/308,793 dated Jun. 12, 2012.
Notice of Allowance for U.S Appl. No. 12/227,659 dated Aug. 1, 2012.
Japanese Office Action for Application Serial No. JP 2009-517267 dated Jul. 11, 2012.
Japanese Office Action for Application Serial No. JP 2009-517264 dated Jul. 11, 2012.
Final Office Action for U.S. Appl. No. 12/309,083 dated Sep. 6, 2012.
Japanese Office Action for Application Serial No. JP 2009-517271 dated Jul. 11, 2012.
Japanese Office Action for Application No. 2009-517281 dated Oct. 5, 2012.
Notice of Allowance for U.S. Appl. No. 12/227,659 dated Feb. 21, 2013.
Chinese Grant for Application Serial No. 200780021406.6 dated Oct. 10, 2012.
Non-Final Office Action for U.S. Appl. No. 12/309,015 dated Dec. 5, 2012.
Notice of Allowance for U.S. Appl. No. 12/227,659 dated Dec. 6, 2012.
"Ceramic Membranes," www.lenntech.com/ceramic-membranes.htm, 2012.
Non-Final Office Action for U.S. Appl. No. 12/308/083 dated Mar. 19, 2013.
Office Action (RR) for U.S. Appl. No. 12/308,792 dated Apr. 11, 2013.
Notice of Allowance for U.S. Appl. No. 12/227,659 dated Apr. 12, 2013.
Non-Final Office Action for U.S. Appl. No. 12/308,793 dated May 29, 2013.
Final Office Action for U.S. Appl. No. 12/309,015 dated Jul. 1, 2013.
Final Office Action for U.S. Appl. No. 12/309,083 dated Aug. 1, 2013.
Non-Final Office Action for U.S. Appl. No. 12/308,792 dated Aug. 16, 2013.
Non-Final Office Action for U.S. Appl. No. 12/309,015 dated Oct. 28, 2013.
Final Office Action for U.S. Appl. No. 12/308,793 dated Nov. 12, 2013.
Non-Final Office Action for U.S. Appl. No. 12/309,083 dated Dec. 2, 2013.
Notice of Allowance for U.S. Appl. No. 12/308,792 dated Oct. 31, 2014.
Interview Summary for U.S. Appl. No. 12/308,792 dated Oct. 31, 2014.
Final Office Action for U.S. Appl. No. 12/309,015 dated Jun. 8, 2015.
Advisory Action for U.S. Appl. No. 12/309,015 dated Sep. 10, 2015.
Final Office Action for U.S. Appl. No. 12/309,083 dated Mar. 27, 2014.
Final Office Action for U.S. Appl. No. 12/309,015 dated Apr. 2, 2014.
Final Office Action for U.S. Appl. No. 12/308,792 dated Feb. 28, 2014.
Non-Final Office Action for U.S. Appl. No. 12/308,793 dated Mar. 13, 2014.
Final Office Action for U.S. Appl. No. 12/308,793 dated Jul. 30, 2014.
Non-Final Office Action for U.S. Appl. No. 12/309,083 dated Jun. 10, 2014.

(56) References Cited

OTHER PUBLICATIONS

Notice of Allowance for U.S. Appl. No. 12/308,792 dated Aug. 13, 2014.
Non-Final Office Action for U.S. Appl. No. 12/309,015 dated Sep. 10, 2014.
Notice of Allowance for U.S. Appl. No. 12/309,015 dated Jul. 1, 2016.

* cited by examiner

METHOD FOR PRODUCING A FIBER COMPOSITE COMPONENT FOR AEROSPACE

FIELD OF THE INVENTION

The present invention relates to a method for producing a fiber composite component, in particular for aerospace, to a molding core for producing such a fiber composite component and to a fiber composite component with at least one stringer which is produced by means of such a molding core and/or such a method.

BACKGROUND OF THE INVENTION

Although it can be applied to any desired fiber composite components, the present invention and the problems on which it is based are explained in more detail below with reference to two-dimensional stringer-stiffened carbon fiber reinforced plastic (CRP) components, for example skin shells of an aircraft.

It is generally known to stiffen CRP skin shells with CRP stringers in order to withstand the loads occurring in the aircraft sector with the lowest possible additional weight. In this respect, a distinction is made essentially between two types of stringers: T and Ω stringers.

The cross section of T stringers is made up of a base and a stem. The base forms the connecting surface with respect to the skin shell. The use of skin shells stiffened with T stringers is widespread in aircraft construction.

Ω stringers may either be adhesively attached in the cured state to the likewise cured skin shell, or be cured wet-in-wet at the same time as the shell. The latter is desired, because it is more favorable from technical aspects of the process. However, supporting or molding cores are necessary for the wet-in-wet production of skin shells stiffened with Ω stringers, in order to fix and support the dimensionally unstable semifinished fiber products in the desired Ω shape during the production process. Skin shells with Ω stringers have the advantage over T stringers that they allow better infiltration during an infusion process for introducing a matrix, for example an epoxy resin, into the semifinished fiber products. Infusion processes are inexpensive in comparison with other known methods for producing fiber composite components, such as the prepreg process for example, because it allows the use of lower-cost semifinished fiber products.

However, there is the problem with the production of Ω stringers that the material used at present for the supporting or molding core is cost-intensive and can only be removed with difficulty after the forming of the Ω stringers, with the result that the material remaining in the stringers contributes adversely to the weight of the fiber composite component, and consequently to the weight of the aircraft. Furthermore, it is problematic that the material remaining in the stringers contributes adversely to the overall weight of the aircraft.

SUMMARY OF THE INVENTION

It is one of the objects of the present invention to provide a lower-cost and lighter fiber composite component, in particular for aerospace.

Accordingly, a method for producing a fiber composite component, in particular a stringer on a base part in aerospace, is provided, comprising the following method steps: introducing a core sleeve into a molding tool for establishing an outer geometry of a molding core to be formed; filling the core sleeve that is introduced with a vacuum-fixable filling material; applying a vacuum to the core sleeve and consequently vacuum-fixing the filling material for forming the molding core; arranging the molding core on a base part comprising semifinished fiber composite products; at least partly laying at least one semifinished fiber product on the molding core that is formed, in order to shape the fiber composite component to be produced; and introducing a matrix into the semifinished fiber products with the molding core and subsequently curing the same at least partially.

Also provided is a molding core for producing a fiber composite component, in particular a stringer on a base part, in particular in aerospace, comprising a core sleeve, which forms an outer surface of the molding core, and a vacuum-fixable filling material, which is vacuum-fixed by means of the core sleeve.

Also provided is a fiber composite component with at least one stringer, in particular for aerospace, which is produced by means of the molding core according to the invention and/or the method according to the invention.

One advantageous effect that may be achieved by one embodiment of the present invention is that the fiber composite component can be produced by means of a lower-cost molding core. In this embodiment, instead of a cost-intensive material, an extremely low-cost fixable filling material, such as quartz sand for example, may be advantageously used for the molding core.

The "vacuum-fixable filling material" is to be understood in the present case as meaning a filling material which has in particular granular elements, which hook into one another when a compressive pressure is applied to the filling material. The form of the filling material is defined in a fixed state for as long as the compressive pressure on the filling material is maintained. If the compressive pressure is removed, the elements are no longer in engagement and changing of the geometrical form of the filling material is enabled.

According to one particular embodiment of the invention, before filling, the core sleeve is held open by gravitational force and/or by a sucking means acting on an outer surface of the core sleeve. Consequently, the core sleeve can be easily filled. The sucking means are formed particularly advantageously by the same means as are used for the vacuum fixing of the core sleeve.

An elastic core sleeve with a somewhat smaller diameter than the molding core to be formed or a core sleeve with a somewhat greater diameter may be used for example, tolerable fold formations possibly occurring in the latter case.

In the case of a further embodiment of the invention, the vacuum-fixable filling material in the molding tool is compacted and/or shaken before the vacuum fixing. "Compacting" is to be understood as meaning compacting of the grains of the filling material.

The molding tool may be formed such that it can be divided in the longitudinal direction, in order to ensure easy removal of the molding core.

Compacting and/or shaking before the vacuum fixing is conducive to engagement of the elements of the filling material and therefore leads to a fixed defined geometrical form of the filling material when the compressive pressure is applied.

"Vacuum fixing" is to be understood as meaning the provision of a negative pressure at an opening of the core sleeve. As a result of the negative pressure, the core sleeve draws itself firmly around the fixable filling material and consequently fixes it. The opening is subsequently closed or sealed by, for example, welding and/or adhesive bonding. Alternatively, a vacuum generating device may remain permanently connected until after the curing of the CRP component. As a result, process monitoring is better possible, such as for example the detection of leaks in the core sleeve. Furthermore, the vacuum can be maintained in the core sleeve when there are leaks in the latter.

According to a further embodiment of the invention, reinforcing means are arranged in the region of transitions, to be formed with a sharp edge, of the outer geometry of the molding core to be formed, inside and/or outside the core sleeve. One of the effects of these reinforcing means, in particular corner profile parts of an approximately triangular cross section, is that they increase the edge strength of the molding core. Further functions of the corner profile parts may be that of increasing the radii, for example in the region in which the stringer adjoins the base part, providing a design appropriate for the fibers, influencing the resin distribution and protecting the core sleeve from damage.

Although other embodiments of the corner profile parts are conceivable within the scope of the present invention, a configuration with a braided CRP gusset or extruded plastic gusset is particularly suitable. The CRP gusset has a coarsely woven CRP braided tube with a centrally drawn-in fiber strand, which can easily be pressed into a triangular shape. The CRP gusset cures with the fiber composite component. The extruded plastic gusset may be optionally left in the component or removed. The configuration described above with the CRP gusset or plastic gusset offers the following advantages: the undefined formation of resin pockets in the corners is avoided. As a result, on the one hand weight can be saved and on the other hand sharp kinks in the laid CRP fabric can be avoided. Furthermore, there are possibilities for optimized fiber orientation in the stringer and/or base part as a result of increased radii. Furthermore, unwanted rapid advancement of the resin during the infiltration is prevented, since any cavities are filled by the molding core with the corner profile parts. Furthermore, easier and more reliable removal from the mold is ensured. Jamming of the core in the corners is less likely to occur. Furthermore, the sensitivity of a brittle or soft molding core during handling is reduced, since loads are shifted to the corner profile parts. Furthermore, mold core production is simplified, since the molding core no longer has to be formed with a sharp edge. In addition, the core sleeve undergoes less stress with corner profile parts arranged on its outside, since the core sleeve no longer forms sharp edges at which the core sleeve material could suffer fatigue.

"Semifinished fiber products" are to be understood as meaning woven or laid fabrics and fiber mats. These are provided with a matrix, for example an epoxy resin, and subsequently cured, for example with the aid of an autoclave, to form a fiber composite component.

A release layer, which reduces adhesive attachment of the cured fiber composite component, may be applied to the core sleeve. This facilitates removal of the core sleeve after the at least partial curing of the portion of the fiber composite component that is created by means of the molding core.

According to a further embodiment of the invention, the molding core is arranged on a base part comprising semi-finished fiber composite products and/or is at least partially surrounded by semifinished fiber products to form at least a portion of the fiber composite component. Consequently, base parts, for example skin shells, pressure domes, etc. with Ω stringers can be advantageously formed. As an alternative or in addition, separate fiber composite components, which are defined entirely in their form by the molding core, can also be produced.

According to a further embodiment of the invention, after the ending of the vacuum fixing, the fixable filling material is removed from the core sleeve, in particular is shaken out, flushed out and/or extracted by suction. The removal of the vacuum means that the fixable filling material is no longer fixed and can be removed from the core sleeve out of an opening of the core sleeve. This may take place for example by means of a suction tube, which is pushed into the filling material and sucks it out of the core sleeve. As soon as filling material has been adequately removed from the core sleeve, it is possible, for example in the production of an Ω stringer, for the core sleeve to be drawn out from it in the longitudinal direction of the Ω stringer. Consequently, the core then no longer contributes to the overall weight of an aircraft and consequently no longer adversely affects its payload.

According to one particular embodiment of the invention, the molding core is formed with at least one undercut. This undercut may lie in the longitudinal direction of the molding core, for example. Consequently, stringers of variable cross section in their longitudinal direction can be produced by means of such a molding core. It may also be advantageous that, after removal of the vacuum fixing and the filling material, the core sleeve can be advantageously removed from the molding core with an undercut.

BRIEF DESCRIPTION OF THE DRAWINGS

The present invention is explained in more detail below using preferred exemplary embodiments and with reference to the attached figures of the drawings, in which.

In the figures, the same reference numbers refer to identical or functionally identical components unless otherwise stated.

DETAILED DESCRIPTION OF THE INVENTION

Figure 1:
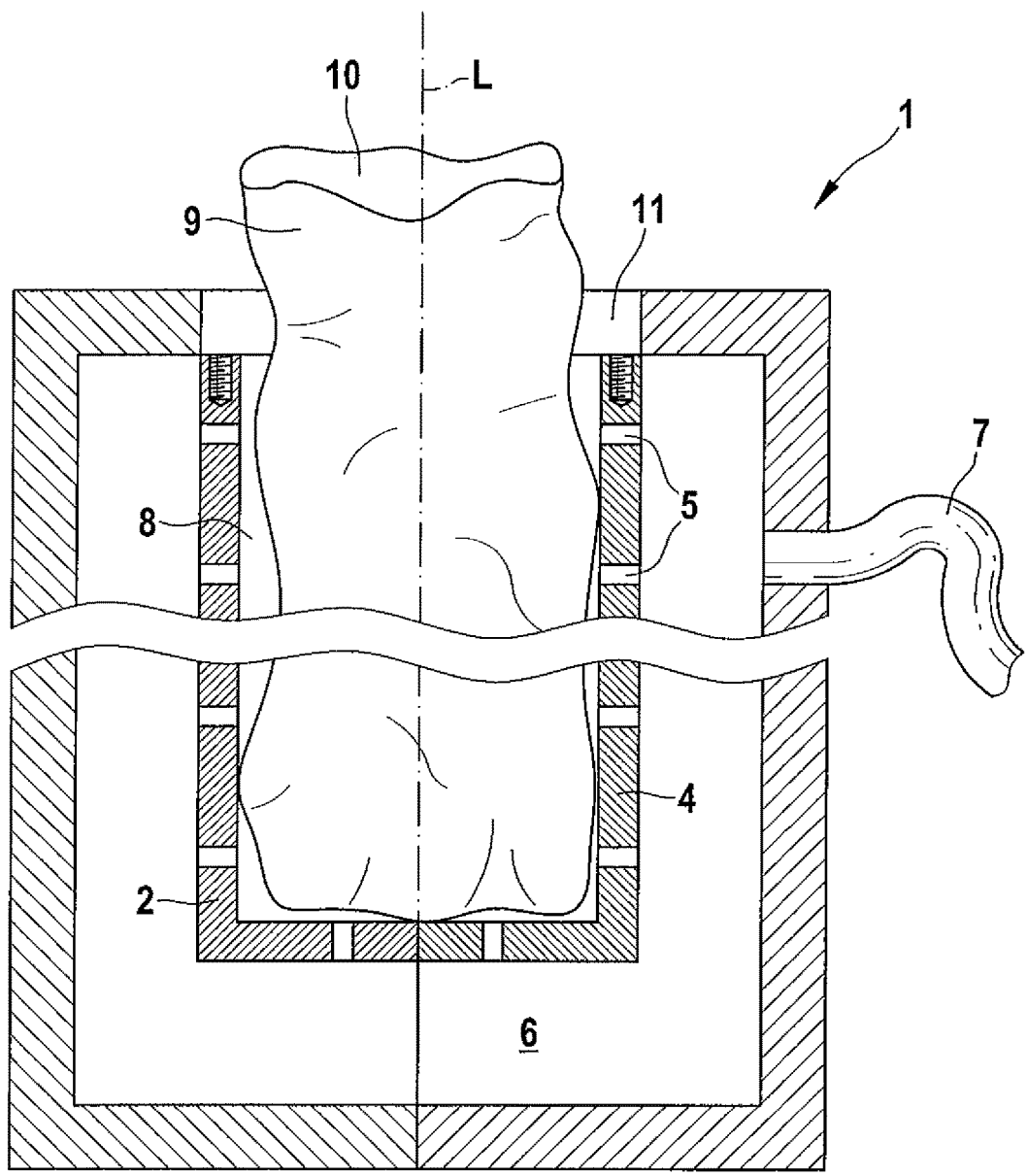
FIG. 1 shows a state of the method in the production of a molding core according to an exemplary embodiment of the present invention that is given by way of example.
Figure 2:
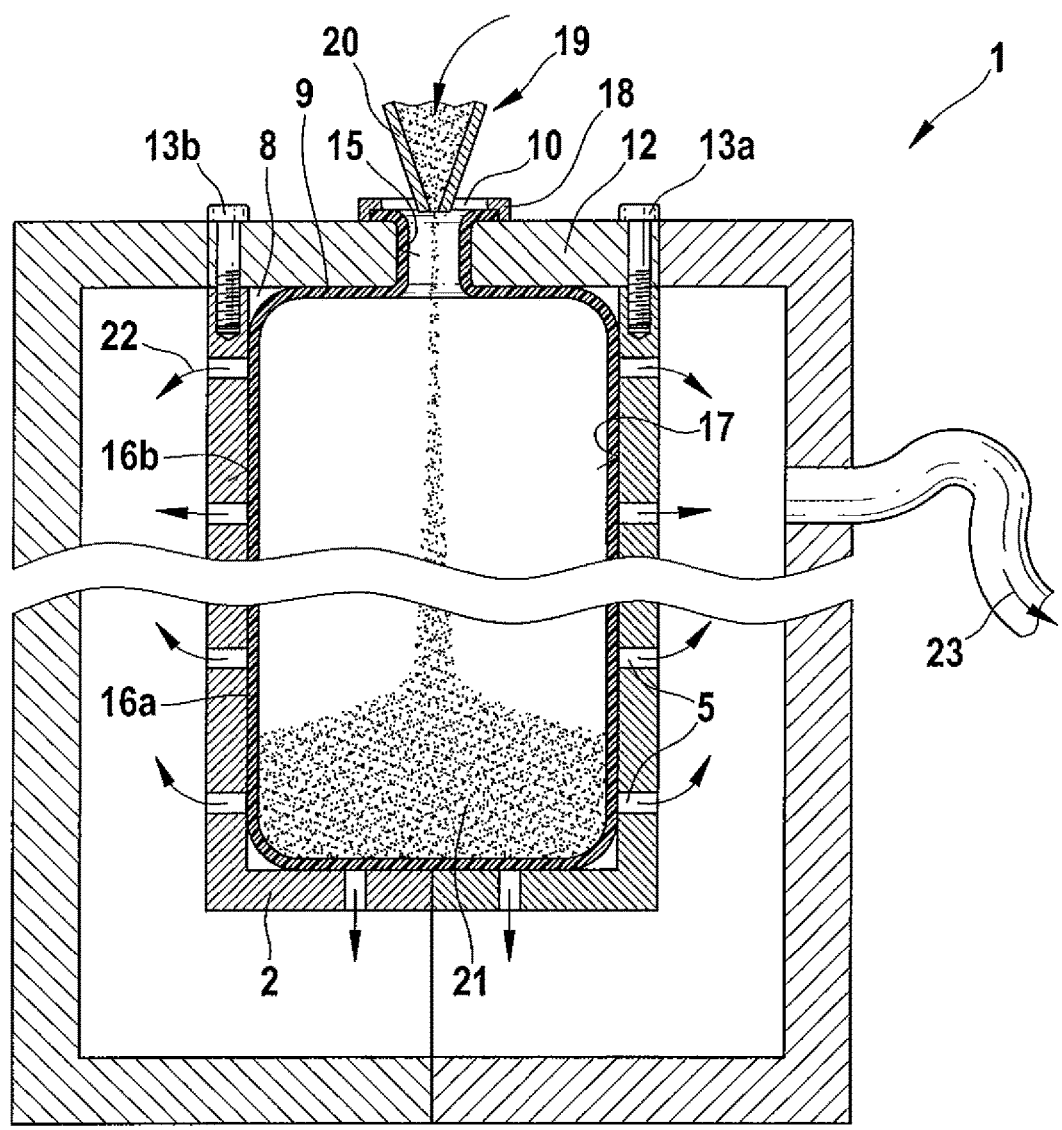
FIG. 2 shows a further state of the method in the production of the molding core according to the exemplary embodiment that is given by way of example.
Figure 3:
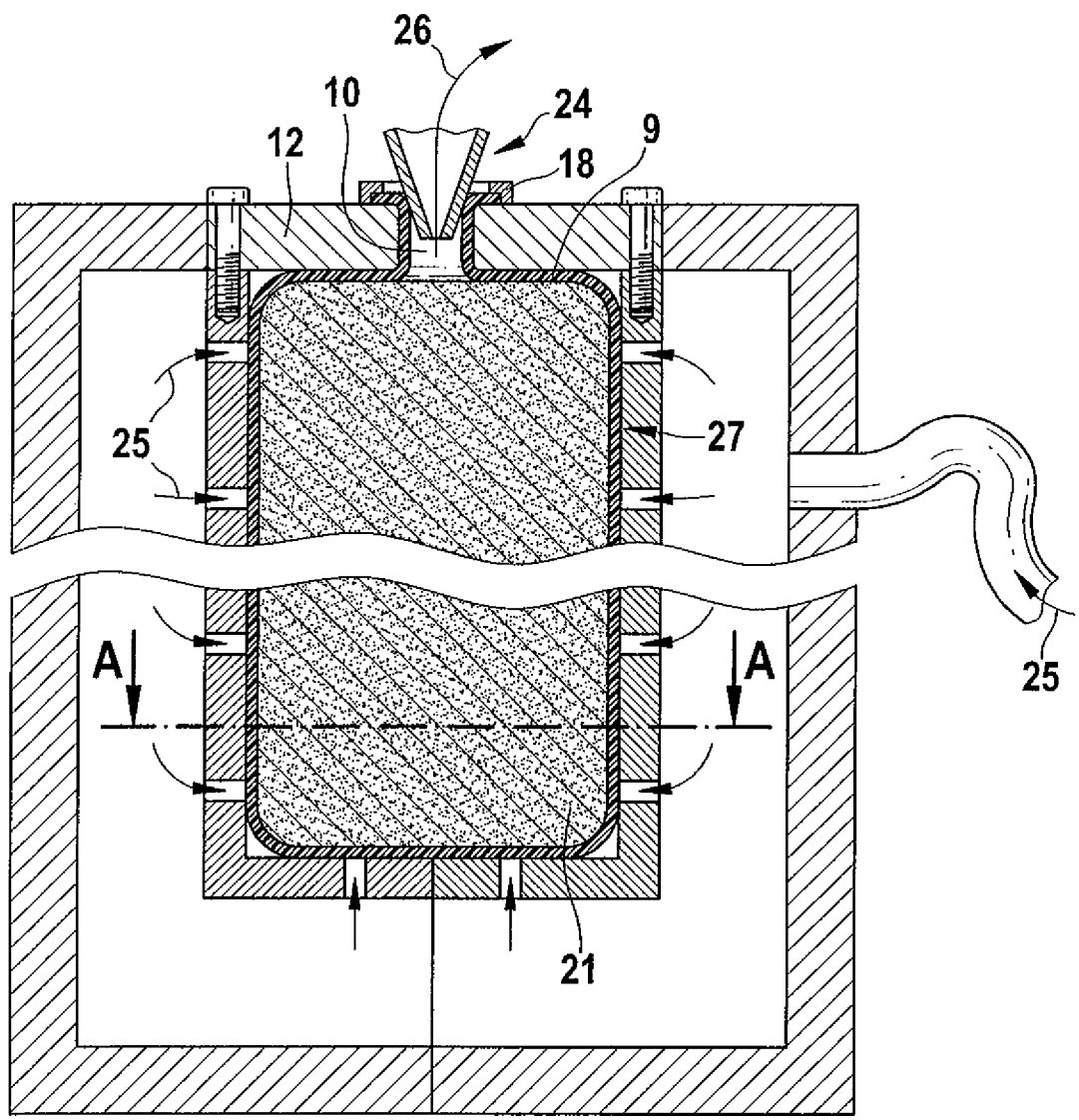
FIG. 3 shows yet another state of the method in the production of the molding core according to the exemplary embodiment that is given by way of example.

FIGS. 1 to 3 show a number of states of the method according to an exemplary embodiment of the present invention.

Arranged in a device 1 is a molding tool 2. The molding tool 2 may have a cross section 3 such as that represented in FIG. 4A. The cross section 3 of the molding tool 2 is formed such that it is essentially trapezoidal. A wall 4 of the molding tool 2 is provided with a multiplicity of small holes 5, in order to prevent sucking in of the core sleeve 9. The introduction of a ventilating film between the core sleeve 9 and the wall 4 to ensure an evenly distributed vacuum is similarly conceivable.

The holes 5 are connected by means of a channel 6 to a hose 7. The hose 7 is in turn connected to a first vacuum pump (not represented). The first vacuum pump makes it possible to generate a negative pressure in an interior space 8 of the molding tool 2.

A preferably elastic and/or flexible core sleeve 9 is introduced into the interior space 8 of the molding tool 2. The core sleeve 9 is formed longitudinally with an upper opening with respect to the effective direction of gravitational force. The core sleeve 9 is preferably produced from a plastic, in particular a polyamide and/or a PTFE plastic. The core sleeve 9 is aligned with its longitudinal axis L along the longitudinal axis of the molding tool 2 and protrudes at its upper end, which has the opening 10, from a closable opening 11 of the device 1.

Preferably, a portion of the core sleeve 9 that has the opening 10 is subsequently pushed through an opening 15 of a plate 12 and fastened there by means of a clamping ring 18.

According to the present exemplary embodiment, the closable opening 11 of the device 1 is closed by the plate 12 and the latter is closed in a sealing manner with respect to the interior space 8 of the molding tool 2 by means of suitable fastening means 13a, 13b.

Before or after that, the first vacuum pump is switched on to generate a vacuum in the interior space 8 of the molding tool 2. This has the effect that a wall 16a of the core sleeve 9 is sucked against an inner surface 17 of the molding tool. Consequently, the core sleeve 9 comes to lie with its wall 16a snugly against the inner surface 17 of the molding tool. The arrows 22 and 23 indicate the direction of flow of the air.

The molding tool 2 is advantageously provided with such a number of holes 5 that the wall 16a of the core sleeve 9 lies completely against the inner surface 17 of the molding tool and against the plate 12 for closing the opening 11. Instead of holes, in the case of a multipart molding tool 2, gaps, in particular in the region of corners of the cross section of the molding tool, between the multiple parts may be used for applying the vacuum. A multipart molding tool 2 has the advantage of easy introduction of the core sleeve 9 and easy removal of the molding core 27 produced from the molding tool 2 and may be advantageously used for this invention.

Subsequently, a vacuum-fixable filling material, for example quartz sand, is fed to the opening 10 of the core sleeve 9 by means of a feeding device 19. The feeding device 19 may be formed for example by a hopper 20, to which the quartz sand is fed by means of gravitational force and/or compressed air.

The filling of the core sleeve 9 with quartz sand 21 is stopped as soon as the core sleeve 9 is adequately filled, that is to say for example just below the opening 10.

A vacuum sealing device 24 is coupled in a sealing manner to the opening 10 of the core sleeve. The vacuum sealing device may in this case have at least to some extent the same components as the feeding device 19.

In a further step, the first vacuum pump is switched off and then allows flowing of the air in the direction of flow opposite to that shown in FIG. 2, indicated by the arrow 25.

Then, a second vacuum pump (not represented) is switched on and sucks air out of the core sleeve, indicated by the arrow 26, and consequently generates a second vacuum inside the core sleeve 9. The wall 16a of the core sleeve 9 then stretches itself firmly around the fixable quartz sand 21 and compresses it.

On account of the prior pretensioning of the core sleeve 9 by applying the vacuum to the outer surface 16b of the core sleeve 9 by means of the first vacuum pump, the core sleeve 9 does not form any folds during the contraction by means of the second vacuum.

The compression of the quartz sand 21 has the effect that the individual grains of the quartz sand engage in one another, and consequently the molding core 27 is formed. As a result of the low compressibility of the quartz sand, the outer shape of the molding core 27 changes only minimally under the effect of the contraction of the wall 16a of the core sleeve 9.

In addition, the molding tool 2 may be shaken in the longitudinal direction of the core sleeve 9, for example before the application of the second vacuum, in order to achieve compaction, and consequently improved strength. This increases the resistance to point loads of the molding core 27 that is formed.

Figure 4A:
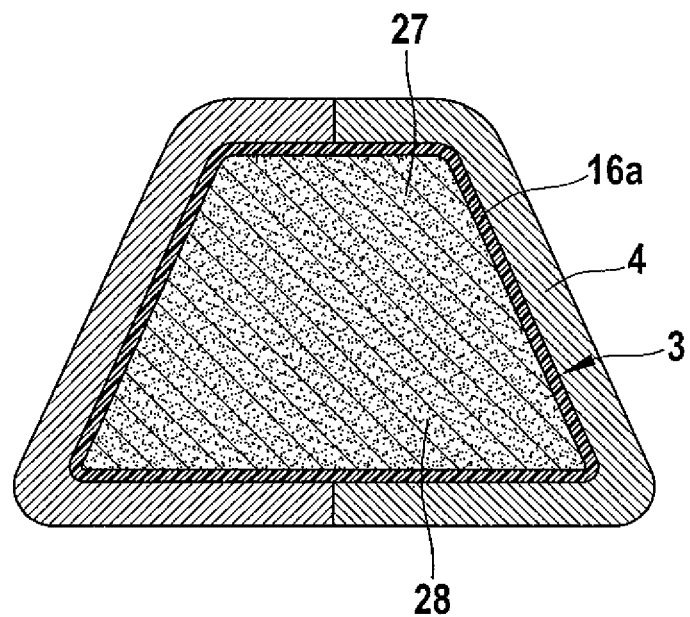
FIG. 4A shows a section along a sectional line A-A from FIG. 3 according to the exemplary embodiment.

The molding core 27 that is formed has the cross section 28 shown in FIG. 4A.

Figure 4B:
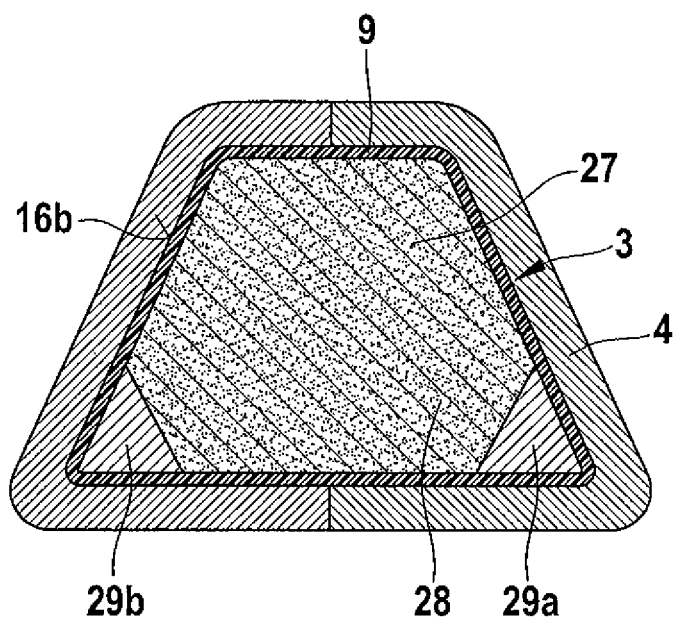
FIG. 4B shows a section along the sectional line A-A from FIG. 3 according to a further exemplary embodiment of the present invention.

In addition, as shown in FIG. 4B, reinforcing elements in the form of corner profiles 29a, 29b may be arranged within the core sleeve 9 before the application of the second vacuum.

In a further step, according to the present exemplary embodiment, the opening 10 of the core sleeve 9 is closed, for example welded, by means of the vacuum sealing device. Alternatively, it may be provided that the vacuum remains connected for as long as vacuum fixing is required. Consequently, quality control can be carried out, for example the detection of leaks in the core sleeve 9. If the vacuum sealing device 24 is then moved away, for example upwards, the second vacuum is retained within the core sleeve 9. The plate 12 is then lifted off in a further method step. After the opening of the molding tool 2, the dimensionally stable molding core 27 is removed from it and arranged on a base part 31 comprising a number of fiber mats.

Figure 5:
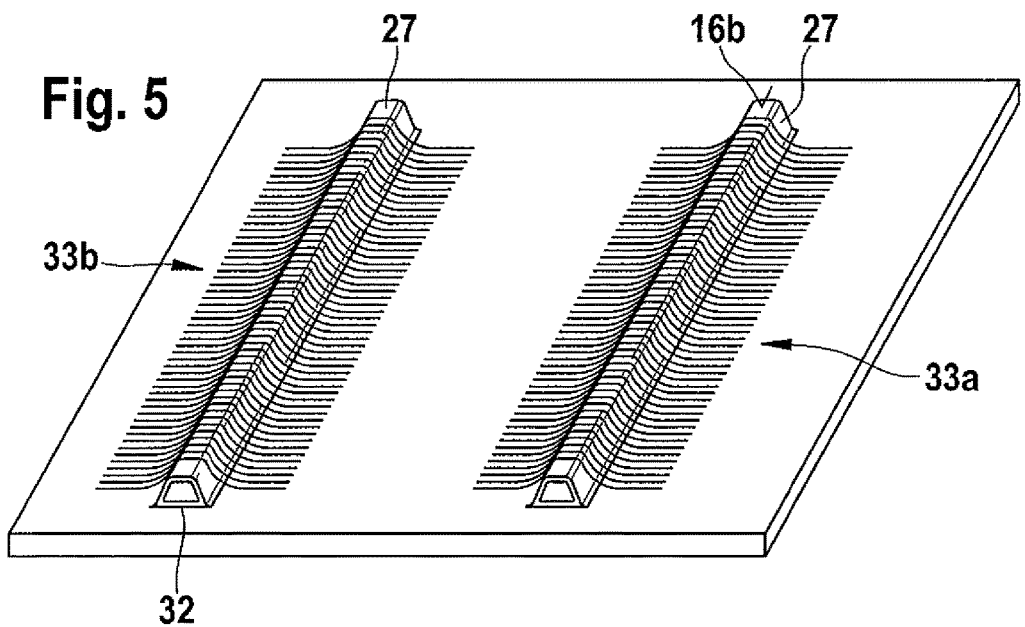
FIG. 5 shows a state of the method in the production of a fiber composite component according to the exemplary embodiment that is given by way of example.
Figure 6:
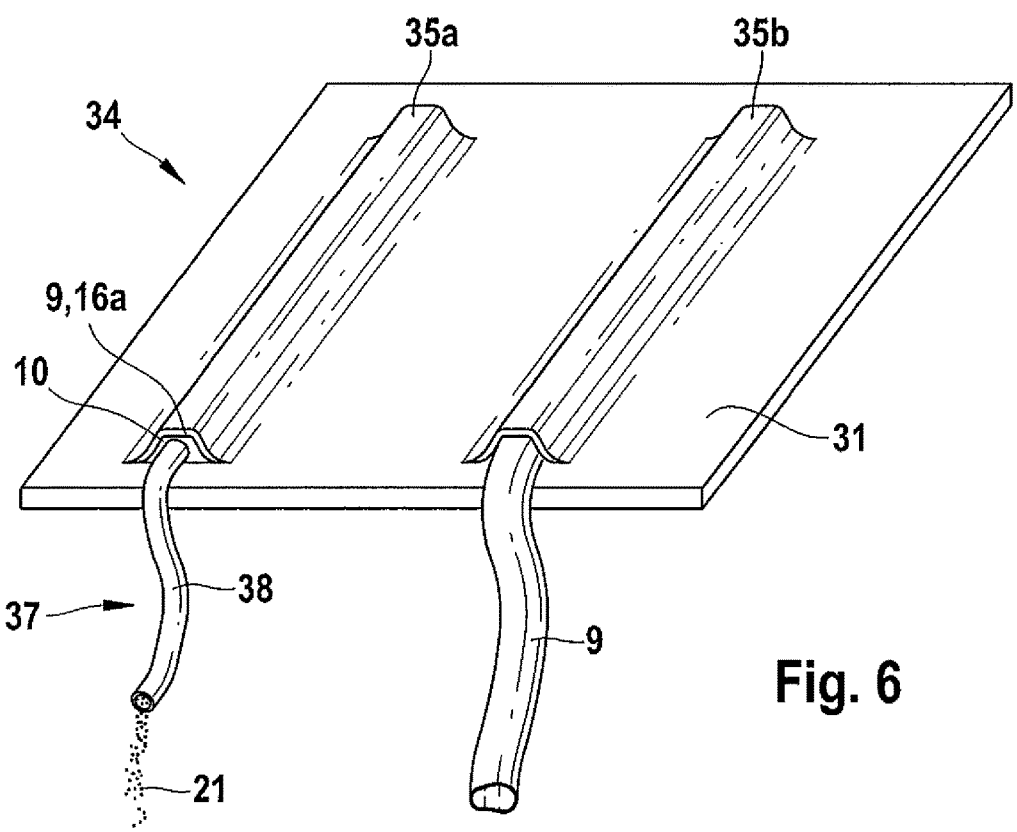
FIG. 6 shows a further state of the method in the production of a fiber composite component according to the exemplary embodiment that is given by way of example.

FIGS. 5 and 6 show further states of the method in the production of a fiber composite component according to the exemplary embodiment that is given by way of example.

Two molding cores 27 of an approximately trapezoidal cross section, which have been produced in particular by the method described above, are arranged with their base 32 lying on a base part 31. The base part 31 has at least one layer of a semifinished fiber product.

In a further step, further semifinished fiber products are laid flat on the molding cores 27. The semifinished fiber products 33a, 33b thereby lie with a middle portion on the outer surface 16b of the molding cores 27 and with their ends on the base part 31, that is to say for example on the skin of an aircraft.

Various production methods may be used for producing the fiber composite component. The infusion process is preferably chosen, in order to introduce a matrix, that is to say for example epoxy resin, into the semifinished fiber products 31, 33a, 33b. The prepreg process can similarly be used here.

In a further step, the base part 31 is advantageously cured with the molding cores 27a, 27b and the semifinished fiber products 33a, 33b under the effect of heat and pressure in an oven or autoclave, depending on the process used. It is important here that the core sleeve 9 reliably withstands the process temperature and the process pressure.

The semifinished fiber products 33a, 33b cure for example in a suitable oven or autoclave (not represented) to form stringers 35a, 35b. After curing, the at least partially cured fiber composite component 34 consequently has the two Ω stringers 35a, 35b.

In a further method step given by way of example, after the core sleeve 9 is opened at the end face, a suction tube 38 may be introduced into the opening 10 of the core sleeve 9. The suction tube 38 sucks the quartz sand 21 out of the core sleeve 9, and consequently out of the stringer, illustrated in an exemplary fashion in FIG. 6 for the stringer 35a.

Once the quartz sand 21 has been largely removed, the core sleeve 9 can be drawn out of the stringer in the longitudinal direction, represented in an exemplary fashion in FIG. 6 for the stringer 35b. This is also possible whenever the stringer 35a, 35b has undercuts in the longitudinal direction, that is to say recesses in the stringers that extend transversely to the longitudinal direction of the stringers. Removal of the core sleeve 9 or the molding cores 27 from the mold is consequently ensured in an easy way. After that, the fiber composite component 34 can be further processed or used directly.

The invention is not restricted to the specific method represented in the figures for producing a fiber composite component in aerospace.

For example, the individual sequence of individual method steps of the production method according to the invention can be changed in various ways. The form taken by the individual method steps can also be modified. For example, flushing out of the quartz sand instead of extraction by suction may be carried out before the removal of the core sleeve from the mold. The molding core may also be drawn or pressed out of the stringer as a whole in the longitudinal direction of the said stringer.

Furthermore, the geometry of the molding core can be modified in various ways.

Furthermore, it is also possible for a number of molding cores to be used to form a single molding core, around which fiber composite mats are placed. This allows a more complex geometry to be created by means of the multiplicity of molding cores and consequently more complex fiber composite components to be produced.

The invention claimed is:

1. A method for producing a fiber composite component, comprising:
   providing a molding tool;
   introducing a core sleeve into the molding tool for establishing an outer geometry of a molding core to be formed, wherein a cross section of the molding core is trapezoidal;
   providing reinforcing corner profiles in opposing corners of the molding tool, wherein the reinforcing corner profiles include an outer geometry that conforms to an inner geometry of the molding tool;
   filling the core sleeve with a vacuum-fixable filling material;
   applying a vacuum to the core sleeve to vacuum-fix the vacuum-fixable filling material, thereby forming a rigid molding core that is compressed within the core sleeve between the portions of the corner profiles, wherein the molding core is elongated and comprises a length along a first axis and a width along a second axis that is orthogonal to the first axis, wherein the length is greater than the width;
   opening the molding tool and removing the molding core, the core sleeve, and the corner profiles therefrom;
   applying a release layer to the core sleeve, thereby reducing adhesive attachment of a semifinished fiber composite product to the core sleeve, wherein the release layer is applied on a top surface of the core sleeve and is arranged between the core sleeve and the semifinished fiber composite product;
   arranging the molding core, the core sleeve, and the corner profiles which are free of semifinished fiber composite product on a planar surface of a base part comprising semifinished fiber composite products, wherein the molding core is arranged so that the first axis is substantially parallel to the planar surface on the base part, and wherein at least two corner profiles are arranged along the longitudinal axis of the molding core one after the other; and
   laying at least one semifinished fiber product over the molding core, the core sleeve, the corner profiles, and the planar surface of the base part for shaping the fiber composite component to be produced.

2. The method according to claim 1, wherein the filling of the core sleeve takes place by at least one of a gravitational force and a blower stream, acting on the vacuum-fixable filling material.

3. The method according to claim 1, wherein before filling, the core sleeve is held open by at least one of a gravitational force and by a first vacuum pump, acting on an outer surface of the core sleeve.

4. The method according to claim 1, wherein the vacuum for the vacuum fixing is monitored for quality assurance.

5. The method according to claim 1, wherein the vacuum-fixable filling material in the molding tool is compacted, shaken, or combination thereof before the vacuum fixing.

6. The method according to claim 1, wherein providing reinforcing corner profiles comprises providing a braided carbon fiber reinforced plastic (CRP) gusset comprising a carbon fiber reinforced plastic (CRP) braided tube with a centrally drawn-in fiber strand, which is pressed into a triangular shape or an extruded plastic gusset.

7. The method according to claim 1, wherein the molding tool is divided in a longitudinal direction of the molding core.

8. The method according to claim 1, wherein, after ending applying the vacuum, the fixable filling material is removed from the core sleeve.

9. The method according to claim 8, wherein the fixable filling material is removed by at least one of shaking out, flushing out, and extraction by suction method.

10. The method according to claim 1, further comprising at least partially curing the fiber composite component and removing the core sleeve from the at least partially cured portion of the fiber composite component.

11. The method according to claim 1, wherein the core sleeve is formed from an elastic or a flexible material.

12. The method according to claim 1, wherein the core sleeve comprises plastic.

13. The method according to claim 1, wherein the molding core is formed with at least one undercut.

14. The method according to claim 1, wherein the fixable filling material is a sand or a quartz sand.

15. The method according to claim 1, wherein the method for producing the fiber composite component takes a form of at least one of a prepreg and vacuum infusion process.

16. The method according to claim 12, wherein the core sleeve comprises polymide or a PTFE plastic.

17. The method according to claim 1, further comprising removing the corner profiles from the fiber composite component.

* * * * *